United States Patent
Fairhurst et al.

(10) Patent No.: US 7,305,680 B2
(45) Date of Patent: Dec. 4, 2007

(54) LISTENING MODULE FOR ASYNCHRONOUS MESSAGES SENT BETWEEN ELECTRONIC DEVICES OF A DISTRIBUTED NETWORK

(75) Inventors: Jon Arthur Fairhurst, Camas, WA (US); Mark Gregory Hanley, Skamania, WA (US); Vishnu Kumar Shivaji Rao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 865 days.

(21) Appl. No.: 10/218,333

(22) Filed: Aug. 13, 2002

(65) Prior Publication Data

US 2004/0034697 A1    Feb. 19, 2004

(51) Int. Cl.
*G06F 9/54* (2006.01)
*G06F 9/46* (2006.01)
*G06F 15/16* (2006.01)
*G06F 15/173* (2006.01)

(52) U.S. Cl. .................. 719/318; 709/223; 709/224
(58) Field of Classification Search ............... 719/318, 719/328; 709/250, 253, 223, 224
See application file for complete search history.

(56) References Cited

U.S. PATENT DOCUMENTS

| | | | |
|---|---|---|---|
| 5,930,471 A | 7/1999 | Milewski et al. | 395/200.04 |
| 6,160,796 A * | 12/2000 | Zou | 370/257 |
| 6,993,771 B1 * | 1/2006 | Hasha et al. | 719/318 |
| 2002/0078259 A1 * | 6/2002 | Wendorf et al. | 719/328 |
| 2002/0169845 A1 * | 11/2002 | Szucs et al. | 709/208 |
| 2003/0009588 A1 * | 1/2003 | Bodlaender | 709/238 |
| 2003/0084123 A1 * | 5/2003 | Kamel | 709/219 |

* cited by examiner

*Primary Examiner*—Li B. Zhen
(74) *Attorney, Agent, or Firm*—Madson & Austin

(57) ABSTRACT

An electronic device is disclosed that is adapted for use in a distributed network of electronic devices. The device includes a processor, a communications layer and memory. The communications layer is in electronic communication with the processor for communications with the distributed network. The memory is in electronic communication with the processor for storing data. A software element is configured by an application to send a request to a plurality of receiver components where the request requires a response from each receiver component of the plurality of receiver components. The device also includes a smart listener configured to receive the request from the software element and to store the request in the memory. The smart listener is configured to transmit the request to the plurality of receiver components through the distributed network and to listen for responses from any of the plurality of receiver components.

7 Claims, 7 Drawing Sheets

LISTENING MODULE FOR ASYNCHRONOUS MESSAGES SENT BETWEEN ELECTRONIC DEVICES OF A DISTRIBUTED NETWORK

TECHNICAL FIELD

This invention relates generally to consumer electronic devices, and is more particularly directed toward systems and methods for listening for asynchronous messages sent between consumer electronic devices of a distributed network.

BACKGROUND

Computer and communication technologies continue to advance at a rapid pace. Indeed, computer and communication technologies are involved in many aspects of a person's day. For example, many consumer electronic devices being used today have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Modern electronic devices, including modern consumer electronic devices, typically have one or more processors. The processor(s) usually are interconnected to different external inputs and outputs and function to manage the particular device. For example, a processor in a video cassette recorder may be connected to buttons used to rewind, fast-forward, play, stop, eject, record, etc.

Many electronic devices, appliances, etc., include one or more small computers. For example, television (TV) sets, compact disc (CD) players, digital video disc (DVD) players, personal computer (PC) systems, set-top-boxes, video cameras, video cassette recorders (VCRs), radio receivers, tape decks, thermostats, furnaces, air conditioning systems, refrigerators, telephones, typewriters, automobiles, vending machines, and many different types of industrial equipment now typically have small computers, or processors, inside of them. Computer software runs the processors of these devices and tells the processors what to do to carry out certain tasks. For example, the computer software running on a VCR may cause the tape to stop playing when a user hits the stop button on the VCR or on the VCR's remote control.

The typical home entertainment system consists of a variety of different consumer electronic devices. For instance, home entertainment systems typically include a TV, a CD player, a set-top-box and a DVD player. Furthermore, other devices may be used in combination with a typical home entertainment system including personal computer systems, video cameras, VCRs, and the like.

With the increased use of electronic devices, and with the increased demands for the exchange of information, more devices are now able to be connected to one another and to establish electronic communications with one another. Many kinds of devices may benefit from being able to communicate with other devices without needing user intervention. Consumer electronics manufacturers have been working on specifications for connecting digital consumer electronic appliances in a home network so as to provide a standard for the audio/video electronics and the multimedia industries.

The home network may be considered a distributed computing platform. One such specification or standard is represented by the HAVi (Home Audio/Video interoperability) architecture.

The HAVi architecture is designed to help different vendors manufacture products that can interoperate, i.e., cooperate to perform application tasks. As stated, many current consumer electronic devices, such as home entertainment equipment (DVD players, DV camcorders, digital TV sets, etc.) are digital processing and digital storage systems. Connecting these devices in networks makes it possible to share processing and storage resources. This allows coordination of the control of several electronic devices simultaneously. For example, a first device may start recording a television program on a second device while accessing an electronic program guide on a third device. The home network provides the means by which the various electronic devices in the home may be connected to communicate with one another.

As consumer electronic devices have become more complex, demand for the latest devices has increased. As new devices emerge and become popular they are purchased by consumers and connected to their home audiovisual systems or home networks. Consumers typically expect that once connected to the system or connected to a home network these new devices will be able to be controlled and operated within the system and/or the network.

There are many benefits in being able to connect electronic devices together such that they may communicate and work together. For example, information received by a television tuner may be used to set the time and program channels of a video recorder. The user may program a recording on a VCR through use of a menu generated by the TV on the TV screen. Further, such interoperability may allow the TV to generate a menu to interact with a number of device in the network using the TV's remote control. In this example, if the VCR is to record a program at a certain time, it could detect at recording time that the original tuner is not available (e.g. because it is already in use by another device or by a user). The VCR may then try to resolve this situation by trying to find another tuner in the system or on the network or by trying to negotiate with the other device or user to release the original tuner to the VCR.

In view of the foregoing, many kinds of devices may benefit from being able to communicate with other devices. However, as more devices attempt to communicate with one another, inefficiencies may arise that may slow down or otherwise hinder the operation of one or more of the electronic devices. For example, if one device were communicating one or more other devices at the same time, the operation of this device may slow down, or its communication with the other device(s) may slow down due to the demands being placed on the device. Thus, benefits may be realized if electronic devices were enhanced with additional systems and methods for providing more effective communication techniques.

SUMMARY OF THE INVENTION

An electronic device is disclosed that is adapted for use in a distributed network of electronic devices. The device includes a processor, a communications layer and memory. The communications layer is in electronic communication with the processor for communications with the distributed network. The memory is in electronic communication with the processor for storing data. A software element is configured by an application to send a request to a plurality of receiver components where the request requires a response from each receiver component of the plurality of receiver components. The software element uses a smart listener. The smart listener is configured to receive the request from the software element and to store the request in the memory. Further, the smart listener is configured to transmit the request to the plurality of receiver components through the distributed network and to listen for responses from any of the plurality of receiver components. The smart listener is also configured to report to the software element information relating to the responses.

The software element may be configured to send a plurality of requests. In this embodiment the device may also include more than one smart listener where each smart listener is used for a single request. A smart listener manager may be used to manage the one or more smart listeners.

A smart listener may include a listener data structure with a plurality of data items. Each data item may include a receiver component identifier and a response data structure for storing one or more of the responses. A data item may further include a timing data structure for storing timing data.

The software element may further be configured to send a request profile with the request. The smart listener may be configured to receive the request profile. The request profile may include various pieces of data including response failure data, device removed data, device added data, state change data, partial response data, timing limits data, network related event data and/or response configuration data.

The electronic device may be configured to operate on a distributed network. One example of a distributed network is a home audio video interoperability distributed network.

A computer-readable medium for carrying program data is also disclosed. The program data includes executable instructions for implementing a method. The method includes the steps that follow but not necessarily in the following order. The method includes running a first application of a first device on the distributed network and providing a first request by a first software element configured by the first application. The first request is for more than one destination device. The step of providing the first request to a smart listener is also included. The method also includes creating a listener data structure that includes more than one data item, wherein at least one data item is created for each destination device, and wherein each data item includes a receiver component identifier for identifying the destination device and a response data structure for storing one or more of the responses from the corresponding destination device. The first request is transmitted by the smart listener to each destination device. The smart listener listens for any responses from the destination devices. The method includes storing the responses in the response data structure and reporting report data by the smart listener to the software element where the report data is generated based on the responses and based on a request profile.

The method may also include providing a second request by a second software element and providing the second request to a smart listener manager. The smart listener manager may create a second smart listener for the second request. The smart listener manager may also create a plurality of smart listeners for a plurality of requests received from a plurality of software elements.

A method for communicating asynchronous messages across a home audio video interoperability distributed network is also disclosed. The method includes the steps that follow but not necessarily in the following order. The method includes running a first application of a first device on the distributed network and providing a first request by a first software element configured by the first application, the first request being for more than one destination device. The step of providing the first request to a smart listener is also included. The method also includes creating a listener data structure that includes more than one data item, wherein at least one data item is created for each destination device, and wherein each data item includes a receiver component identifier for identifying the destination device and a response data structure for storing one or more of the responses from the corresponding destination device. The step of transmitting the first request by the smart listener to each destination device is also included. Further, listening by the smart listener for any responses from the destination devices is also accomplished in the method. The method includes storing the responses in the response data structure and reporting report data by the smart listener to the software element where the report data is generated based on the responses and based on a request profile.

A consumer electronic device adapted for use in a home audio video interoperability distributed network of electronic devices is also disclosed. The device includes a processor, a communications layer and memory. The communications layer is in electronic communication with the processor for communications with an IEEE-1394 network. The memory is in electronic communication with the processor for storing data. A communications media manager is also provided for enabling software components to communicate using the IEEE-1394 network. Further, the device includes a registry to serve as a directory for the software components. A first software element is configured by an application to send a request to a plurality of receiver components where the first software element expects a response from each receiver component of the plurality of receiver components. The device also includes a smart listener manager configured to receive the request and to create a smart listener. The smart listener is configured to receive the request from the software element and to store the request in the memory. Further, the smart listener is configured to transmit the request to the plurality of receiver components through the IEEE-1394 network and to listen for responses from any of the plurality of receiver components. The smart listener is also configured to report to the software element information relating to the responses. The smart listener manager may be further configured to create a new smart listener for each new request.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
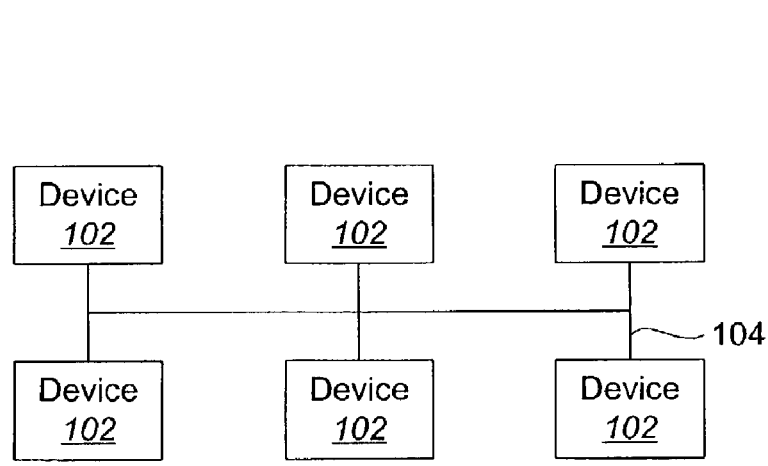
FIG. 1 is a block diagram illustrating a distributed network of electronic devices.

FIG. 1 is a block diagram illustrating a distributed network of electronic devices. The distributed network 100 includes multiple electronic devices 102. The various electronic devices 102 may be connected through use of a computer network medium 104. Some examples of possible electronic devices 102 are televisions, CD players, DVD players, personal computer systems, set-top-boxes, video cameras, video cassette recorders, radio receivers, tape decks, vending machines, telephones, door locks, temperature sensors, motors, switches, lights, printers, fax machines, refrigerators, health monitors, elevators/escalators, copiers, scanners, manufacturing equipment, industrial equipment, computer equipment and peripherals, security systems, monitoring equipment, thermostats, and the like.

Figure 2:
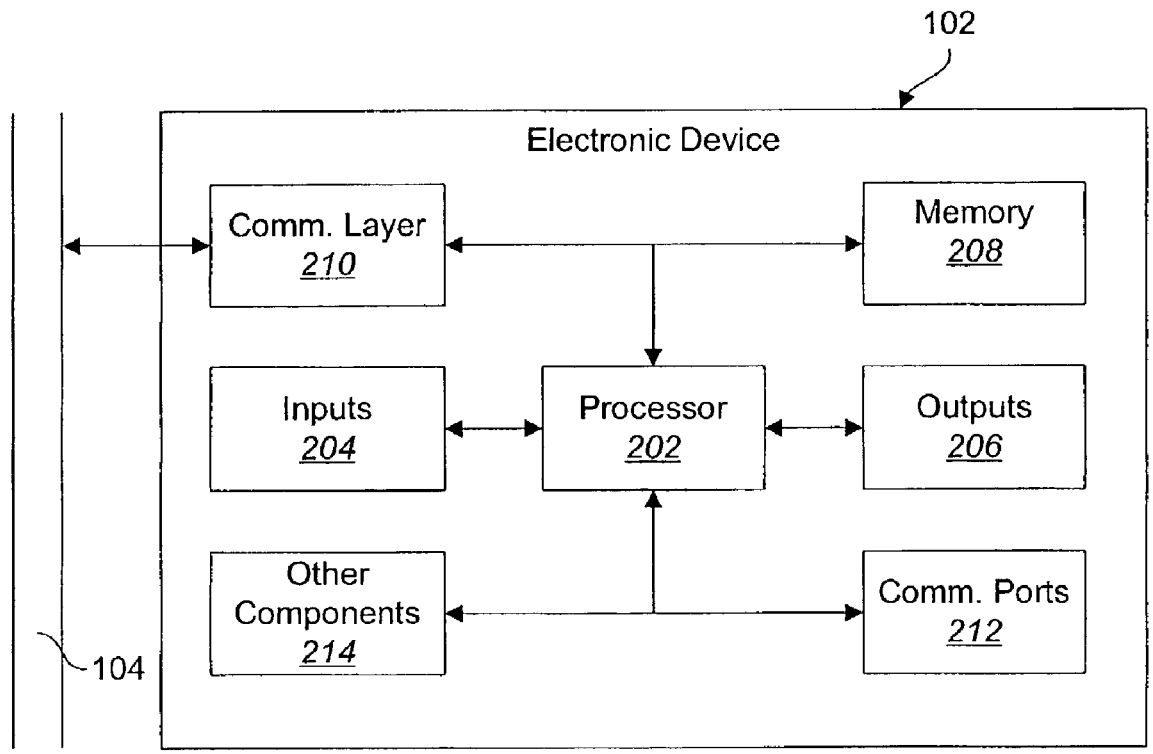
FIG. 2 is block diagram illustrating hardware components of an embodiment of an electronic device.

FIG. 2 is block diagram illustrating the major hardware components typically utilized in an electronic device 102. An electronic device 102 typically includes a processor 202 in electronic communication with input components or devices 204 and/or output components or devices 206. The processor 202 is operably connected to input 204 and/or output devices 206 capable of electronic communication with the processor 202, or, in other words, to devices capable of input and/or output in the form of an electrical signal. Embodiments of devices 102 may include the inputs 204, outputs 206 and the processor 202 within the same physical structure or in separate housings or structures.

The electronic device 102 may also include memory 208. The memory 208 may be a separate component from the processor 202, or it may be on-board memory 208 included in the same part as the processor 202. For example, microcontrollers often include a certain amount of on-board memory.

The processor 202 is also in electronic communication with a communication layer 210. The communication layer 210 may be used for communications with other devices 102. Thus, the communication layers 210 of the various devices may be designed to communicate with each other to send signals or messages between the electronic devices 102. The communication layer 210 may be in electronic communication with the computer network medium 104 for sending and/or receiving messages using the network medium 104.

The electronic device 102 may also include other communication ports 212. In addition, other components 214 may also be included in the electronic device 102.

Of course, those skilled in the art will appreciate the many kinds of different devices that may be used with embodiments herein. Accordingly, the block diagram of FIG. 2 is only meant to illustrate typical components of an embedded device 102 and is not meant to limit the scope of embodiments disclosed herein. Many of the commercially available electronic devices listed above may be used with embodiments herein.

The embodiments disclosed herein may be used within a device network of the HAVi (Home Audio/Video interoperability) architecture. However, it will be appreciated by those skilled in the art that embodiments herein may be used with device networks that do not follow the HAVi architecture. Accordingly, the discussion herein relating to HAVi or the IEEE 1394 network are only meant as illustrative examples. The embodiments and invention claimed are applicable to a broad range of networks and architectures, including many of which are not HAVi or IEEE 1394 network related.

Some aspects of the HAVi architecture are discussed to provide a general framework in which embodiments operate. HAVi is an architecture for providing interoperability among consumer electronic devices 102 adapted for a home network. The interoperability aspects define an architectural model that allows devices 102 of many different vendors to work with one another on the same device network 100. The HAVi architecture supports a wide range of devices 102 including TV sets, CD players, DVD players, personal computers, set-top-boxes, video cameras, VCRs, radio receivers, tape decks, intelligent receiver/decoders (IRDs), digital video tape records (DVTRs), etc., communicating via a common messaging system.

In one embodiment of the HAVi architecture, the IEEE 1394 serial communication bus standard is used as a local bus platform to provide the common messaging system. The IEEE 1394 serial communication bus carries both commands, status information and well as digital audio and digital video signals between devices. The electronic devices of a HAVi network can be viewed as logically coupled to a common IEEE 1394 serial communication bus. Peer-to-peer device communication is supported.

The HAVi architecture provides support for existing devices, a default control model, a means to extend the default control model when new devices or functionality is brought to market, and a common means for device representation. The devices in the HAVi architecture communicate by sending messages over the device network using a generic message passing system. When a new device joins the device network, it is recognized and added to a registry (discussed below). When a device is first connected to the device network, the device is queried to ascertain its characteristics and capabilities. With the IEEE 1394 standard, devices can be added to or removed from the serial bus while the bus is active. If a device is so added or removed, the bus automatically reconfigures itself for transmitting data between the then existing devices.

In order to allow one device to discover the capabilities of another device and to determine which command set to use with that device, a standard device description structure is provided called the self describing data (SDD) structure. The SDD data structure may vary in size. For example, the SDD data structure can be a small number of bytes describing the device type, or it may be a more complex structure also defining the override device control module (DCM) and a graphical representation of the device.

Relating to the graphical representation of the device, by defining the graphical representation in a generic manner, a device's SDD graphical data can be used in other products to display a user interface for that device which promotes vendor interoperability. It also allows a vendor to differentiate a product while maintaining within the general look and feel of the display device. The SDD also enables a control device to present a general control user interface for all devices in the device network.

The devices of the device network may be networked together using a standard communication protocol layer. For example, the IEEE 1394 communication standard may be used. The IEEE 1394 standard is an international standard for implementing a serial bus architecture. The IEEE 1394 standard provides a high-speed serial bus for interconnecting digital devices thereby providing universal input/output connection. The standard defines a digital interface for applications thereby eliminating the need for an application to convert digital data to an analog form before it is transmitted across the bus. Correspondingly, a receiving application will receive digital data from the bus, not analog data and will therefore not be required to convert analog data to digital form.

In the HAVi architecture, the electronic devices in the network are controlled through abstract representations of the devices. The abstract representations are operated upon by a controller and hide some of the specific details of the associated real devices. The abstract representation thus provides a uniform interface for higher levels of software. The abstract representations may be registered with their control properties reflecting those of the device represented. The abstract representations expose their Interoperability API's (discussed below in relation to FIG. 3) to the applications and collectively form a set of services for building portable, distributed applications on the home network.

Figure 3:
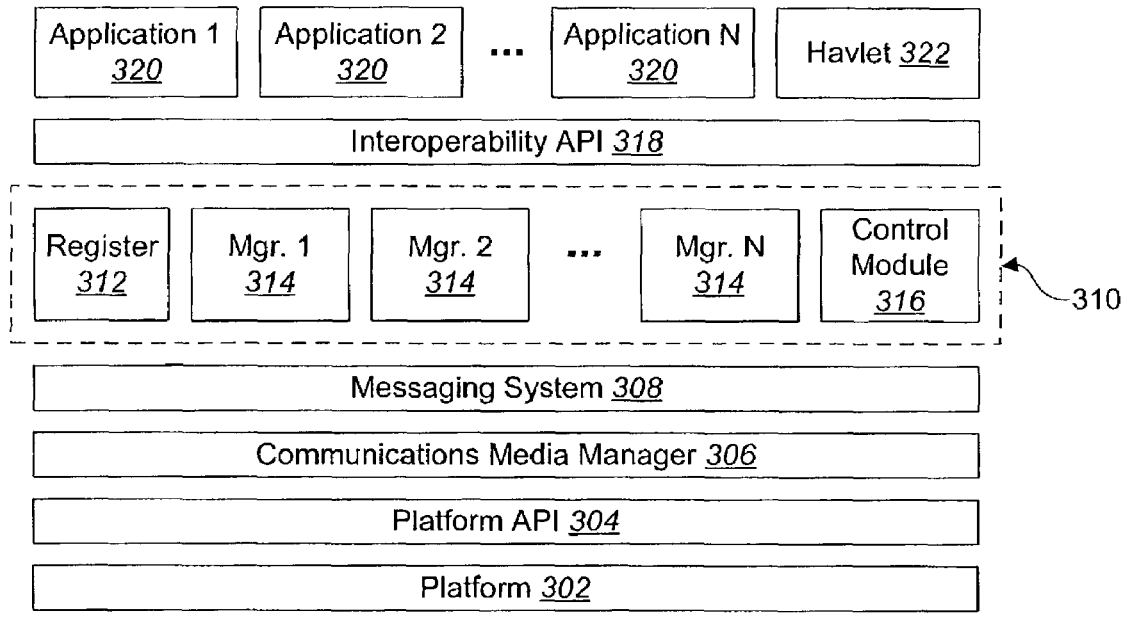
FIG. 3 is an architectural block diagram of an embodiment of an electronic device.

FIG. 3 is an architectural block diagram of an embodiment of an electronic device 102. The platform 302 may be a vendor specific platform such as an operating system. The operating system may be a real-time operating system. The platform application programming interface (API) 304 represents an interface for the platform 302 or calls that may be made into the platform 302. The platform API 304 is usually determined by the particular platform 302 being used.

The communications media manager 306 is the component that manages communications on the computer network medium 104 through use of calls in the platform API 304. If a HAVi architecture is being used, the communications media manager 306 may be a 1394 communications media manager.

The messaging system 308 is responsible for passing messages between the software elements 310. Software applications 320 are hosted on the processor 202 and may communicate with other applications on the network 104. Hereafter the mechanics of communication within such an application 320 will be referred to as a software element 310. The software elements 310 are software components that reside above the platform API 304. The software elements 310 may serve to manage the network 100 or portions of the network 100, to provide a layer of device abstraction, to provide inter-device communications, and to manage a user interface of the device. As shown, the software elements 310 form a middle layer between the platform-specific API 304 and platform independent applications.

Various software elements 310 may be provided to manage the network 100 or portions of the network 100, to provide a layer of device abstraction, to provide inter-device communications, and to manage a user interface of the device. A registry 312 may serve as a directory service allowing software elements 310 or other components to locate another software element 310 or other component on the network 104. The registry 312 holds information about device characteristics and provides a reference to a handler for that device. Devices and services are able to query the registry to locate a device and then, using the handler, can interact with the device.

Managers 314 may serve to manage the various aspects and components of the device 102. One or more managers 314 may be included on the device 102. An event manager (not shown) may be used to serve as an event delivery service. An event may be defined as a change in state of a device 102, software element 310, or of another component (not shown) or of the network 104. A stream manager (not shown) may be used and may be responsible for managing real-time transfer of AV and other media between functional components. A resource manager (not shown) may also be included. The resource manager (not shown) may facilitate sharing of resources and scheduling of actions. Device control modules 316 may also be included as software elements 310. A device control module 316 may be used to control a device 102. A device control module manager (not shown) may be responsible for managing device control modules 316.

As stated, one exemplary application of the embodiments herein may be with a HAVi network. The HAVi standard is described in the HAVi Specification, incorporated herein by reference. In addition to the aforementioned software elements 310, the HAVi Architecture specifies that a network 100 may contain an application module, self describing device data, java runtime environment and a data driven interaction controller.

Of course, it will be appreciated by those skilled in the art that the embodiments and inventive principles disclosed herein are not limited to HAVi or HAVi networks. The inventive principles herein may be applied to various types of communications systems that include electronic devices and/or computers that communicate with each other.

The interoperability API 318 provides a set of services for building portable distributed applications on the network 100. The interoperability API 318 allows consumer electronics manufacturers and third parties to develop applications 320 for the device 201 and/or for the network 100. The API 318 provides an interface to the applications 320 to access and use the functionality provided by the software elements 310 and other software components. For the HAVi Architecture, this API 318 is defined and is designed so that the products from different vendors can interoperate—i.e., can cooperate to perform application tasks.

The applications 320 are computer programs created to operate on the device 102 for operation of the device 102. The applications 320 may use the interoperability API 318 to accomplish tasks.

If the device 102 were in a HAVi system, a havlet 322 may also be included. A havlet 322 is a HAVi Java application that is uploaded on the request of a controller from a device control module 316 or Application Module (not shown).

In the HAVi distributed software architecture, the software elements implement basic services such as network management, device abstraction, inter-device communication and device user interface management. Collectively, these software elements together expose the HAVi Interoperability API, a set of services for building portable distributed applications on the network. Software elements on different HAVi devices communicate with each other via HAVi defined protocols to offer the desired service and the Interoperability API. The software elements on a HAVi device are implemented on top of a device- and vendor specific platform, such as a real-time operating system.

Applications (which are software elements themselves) can then access these APIs transparently across the network.

The electronic devices within a HAVi architecture share the resources available within the network. A user does not have to know from where the functionality is provided, only that it is available. To access or make use of a particular function, the user may access the user interface of the function, which may be presented remotely from the actual device supplying the function. A common way to display the user interface will be through the TV screen, with the function presented as a simple menu.

One illustration of the benefits provided by the HAVi architecture is the setting of a VCR to make a recording. In order to record a TV program, the VCR needs to have several settings made including the desired channel, the start time, the length of recording or the stop time and the date. If a user were watching TV in one room, but the VCR was in another room, he or she may find it difficult to immediately record a program. However, with HAVi the user would simply enter the "record" command using the remote control on the TV in the room where the user is located and all the necessary actions are taken by the HAVi system. In this example, the TV may automatically program the VCR using data obtained from an Electronic Program Guide received by the TV. The VCR may further automatically set and update its own time based on the clock of the TV. Further with this example, if the VCR is disconnected, the network will notice this and inform the user that programmed recordings are no longer possible. The network may also search the network to find another connected and available VCR and use that one instead, thereby transparently delivering the functionality originally requested by the user, even though changes took place in the network configuration.

Figure 4:
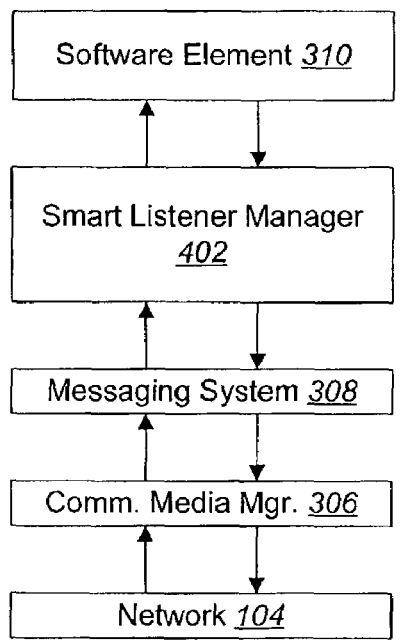
FIG. 4 is a block diagram illustrating use of an embodiment of a smart listener manager.

FIG. 4 is a block diagram illustrating use of an embodiment of a smart listener manager 402. One or more software elements 310 may use the smart listener manager 402 for communications with other devices 102 and/or for communications with other software elements 310. The software element 310 may send messages, requests or communications to receiver components that are part of the network 100. Receiver component may refer to another software element 310, whether on the same device 102 or on a separate device 102, or it may refer to an application 320 that may be on the same device 102 or on a separate device 102, to another device 102, or to any other hardware and/or software component capable of receiving the communication sent by the software element 310.

Figure 5:
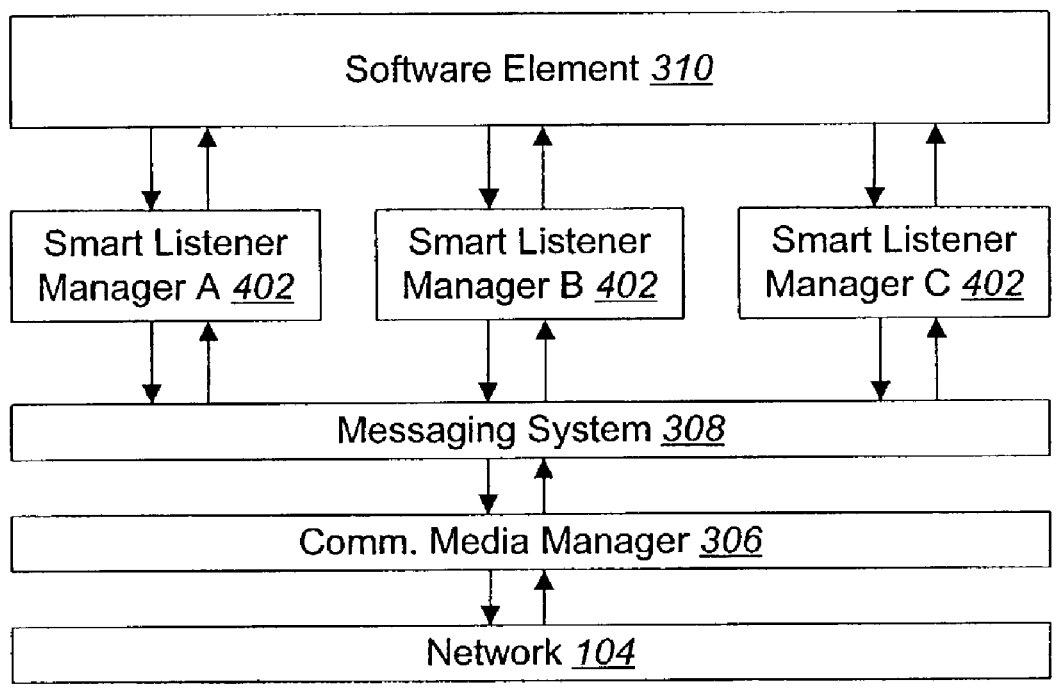
FIG. 5 is a block diagram illustrating the use of several smart listener managers.

FIG. 5 is a block diagram illustrating the use of several smart listener managers 402. Depending upon the needs of the device 102 and/or the needs of the network 104, the communication needs of a software element 310 may be met by using several smart listener managers 402.

Figure 6:
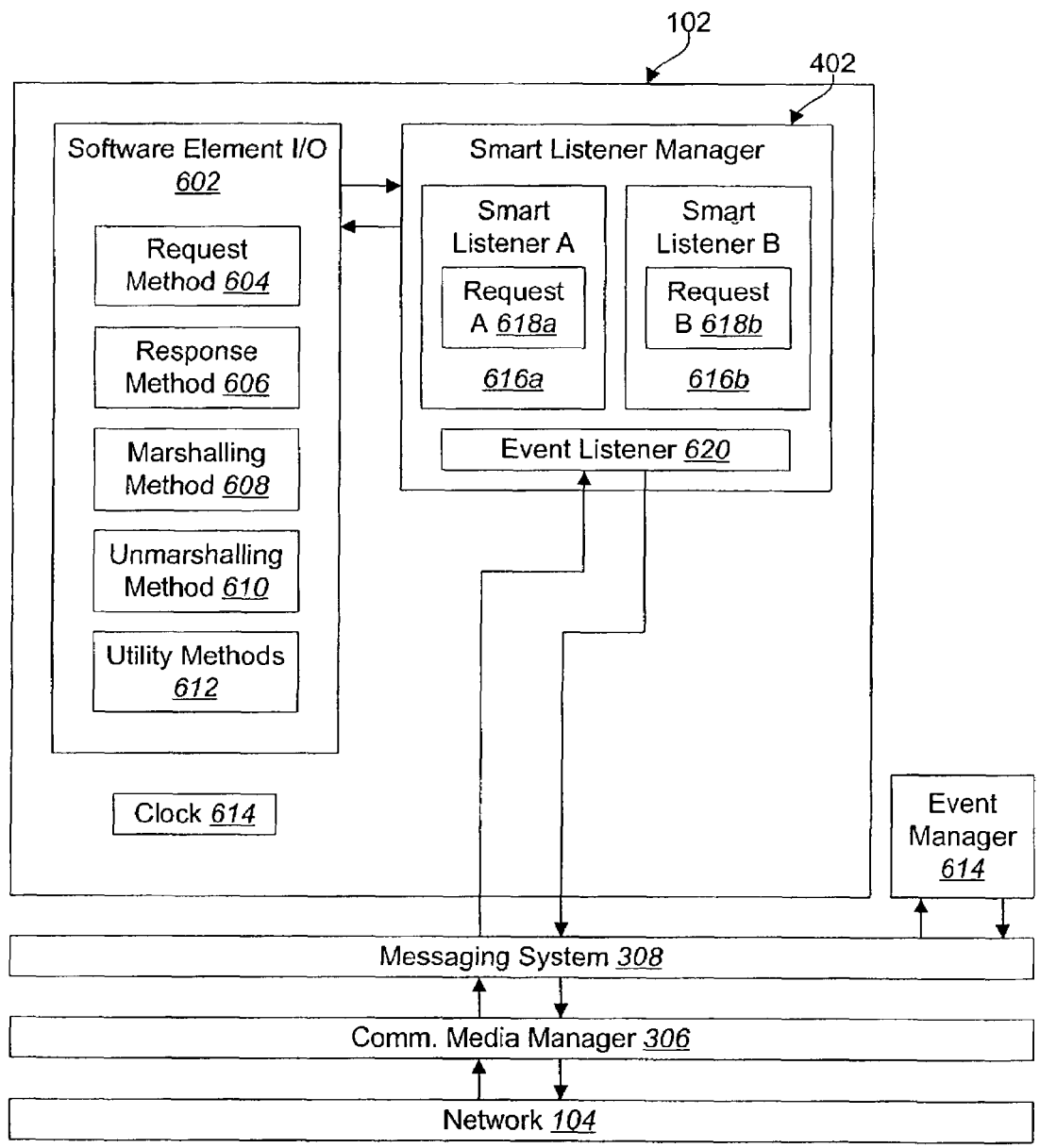
FIG. 6 is a block diagram of an embodiment of a smart listener manager.

FIG. 6 is a block diagram of an embodiment of a smart listener manager 402. For clarity, only certain elements are shown in the device 102 in FIG. 6. However, as discussed and shown elsewhere herein, and as will be appreciated by those skilled in the art, other elements may also be used with or in combination with the device 102.

A software element I/O component 602 may be included to provide input/output functionality to the software element 310. A request method 604 may be provided for use by the software element in sending out a request. A response method 606 may be provided for use by the software element in receiving a response. A marshalling method 608 may be used to organize data. For example, if data needed to be compressed, or needed to be in a particular format, the marshalling method 608 may be used to format the data as needed. The un-marshalling method 610 may be used to unpack, reorganize, or otherwise undo what has been accomplished by the marshalling method 606. Of course, other utility methods 612 may be provided to accomplish various other tasks that may be needed as will be appreciated by those skilled in the art.

A clock 614 may be included for providing timing information. Typically the clock functionality is provided through a combination of hardware and software. The clock 614 may be used to measure the time it takes to receive a response which may enable the smart listener 616 to catch any delayed responses. The clock 614 also enables the smart listener 616 to notify the requesting software element 310 of delays and/or timeouts.

The smart listener manager 402 manages smart listeners 616. In various situations, the smart listener manager 402 may include one smart listener 616, a number of smart listeners 616, or no smart listeners 616. For illustrative purposes, two smart listeners 616a, 616b are shown in FIG. 6. When a request is made by a software element 310, the smart listener manager 402 takes the request and creates a smart listener 616 to process the request. Of course, if a smart listener 616 was already created or instantiated, the smart listener manager 402 may not need to create a new smart listener 616 but it may simply use the already existing smart listener 616. The smart listeners 616 each include at least one request 618, which is more fully discussed in relation to FIG. 7.

The smart listener manager 402 may also include an event listener 620. The event listener 620 may listen for certain events taking place that may be of interest to the smart listeners 616. The event listener 620 may listen for such things as a network reset event (not shown), a new device event (not shown), a device removed event (not shown), etc.

In the embodiment shown in FIG. 6, the smart listener manager 402 may receive the responses from the network 104 and then provide the responses to the smart listener(s) 616 for evaluation. The smart listener manager 402 may use software element 310 identifiers and request identifiers to track and match the responses to the corresponding smart listener 616.

Figure 7:
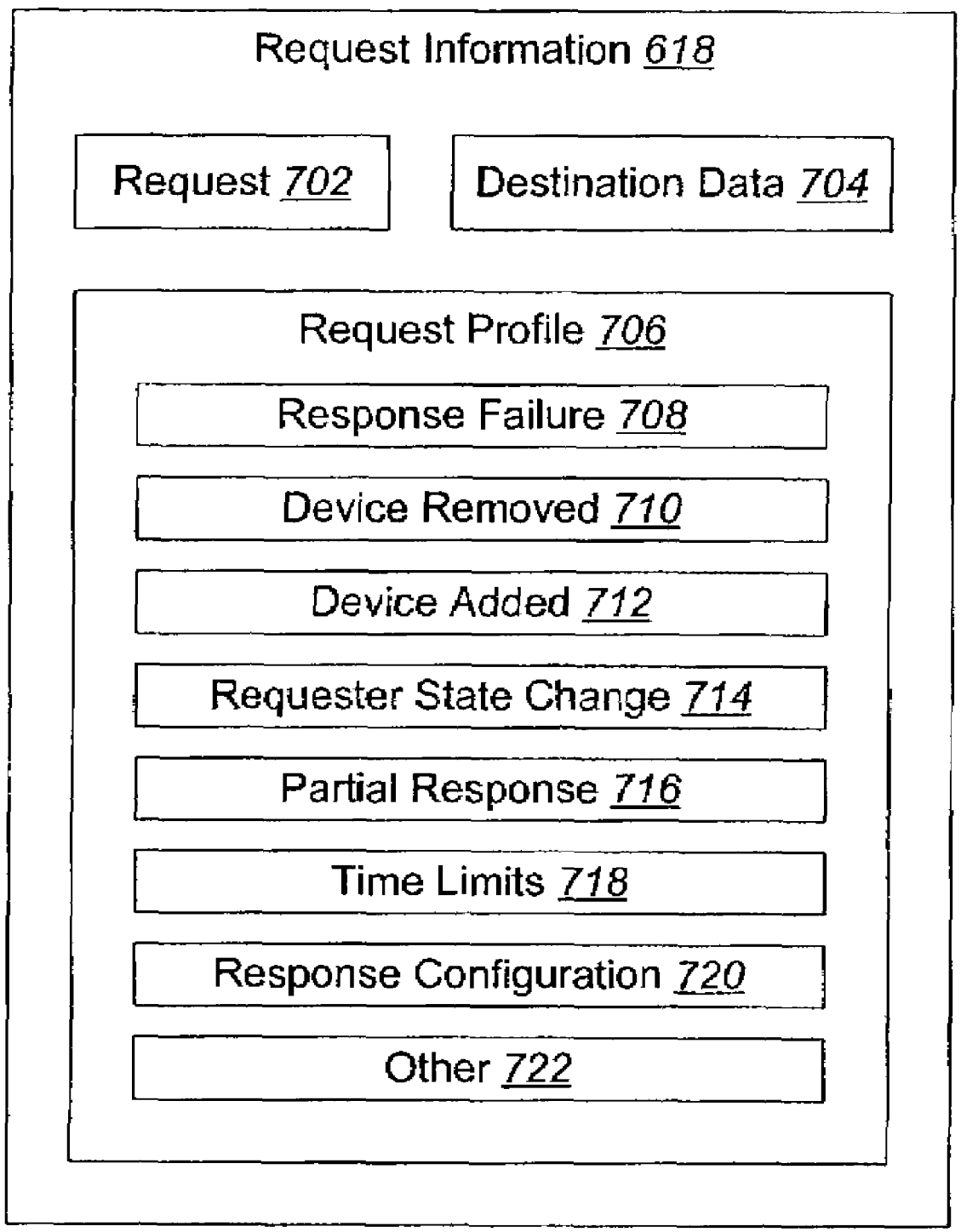
FIG. 7 is a block diagram of an embodiment of a request.

FIG. 7 illustrates a block diagram of an embodiment of request information 618. A smart listener 616 may store one or more pieces of request information 618. The request information 618 may include the information that instructs the smart listener 616 on what to request, what to listen for, and/or how to listen. The request information 618 may include the request 702. The request 702 may be the actual request that is to be sent to one or more destinations across the network 104, or it may be a portion of the actual request, or it may be a larger piece of data that includes the request or a part of the request, it may be another piece of data that corresponds to the request, etc.

Destination data 704 may be included to indicate where on the network 104 the request 702 is to be sent. The destination data 704 may include one or more addresses (not shown), identifications (not shown), etc. In addition, the destination data 704 may include a description of the types of destinations to send to from which the smart listener 616 may determine where to send the request 702. For example, a software element 310 may wish to send a message or request to all the televisions on a network 100. The software element 310 may indicate to the smart listener manager 402 or directly to the smart listener 616 that all televisions are to receive the message or request 702. From this information, the smart listener 616 may send the appropriate messages to all available televisions on the network 100.

A request profile 706 may also be used by the smart listener 616 to indicate how the smart listener 616 is to listen for responses. Response failure 708 data may indicate what action is to be taken if the smart listener 616 fails to receive a response from one or more of the destinations. The device removed data 710 may indicate what action is to be taken if one or more of the devices 102 that are destinations are removed from the network 100. The device added data 712 may indicate what action is to be taken if a new device 102 is added to the network 100 that relates to the request 702. The requester state change data 714 may indicate what action is to be taken if the state of the requestor changes. The partial response data 716 may indicate what action is to be taken by the smart listener 616 if only a partial response is received. The time limits data 718 may include timing information, such as how long the smart listener 616 should wait before considering a device 102 non-responsive, or how long to wait before assuming a response failure, how often the smart listener 616 is to report to the software element 310, etc. Many different kinds of timing information and data may be included if needed.

Response configuration data 720 may also be included to indicate how the response should be formatted before passing it to the software element 310, to indicate how many partial responses are to be received before it is considered a full response, to indicate what the response from the device 102 may look like, etc. The software element 310 may indicate through the response configuration data 720 that the smart listener 616 or smart listener manager 402 is only to report to the software element 310 when all of the destinations have responded. The software element 310 may also indicate through the response configuration data 720 that the smart listener 616 or smart listener manager 402 is to report immediately if certain events or errors are generated. Another use for the response configuration data 720 is that it may indicate whether the software element 310 is to be notified of non-responsiveness or whether responses are not timely received. As illustrated, a number of items may be indicated in the response configuration data 720. Other data 722 may also be included in the request profile 706 as needed to configure the smart listener 616 for particular listening characteristics. For example, other data 722 may include network related event data.

Figure 8:
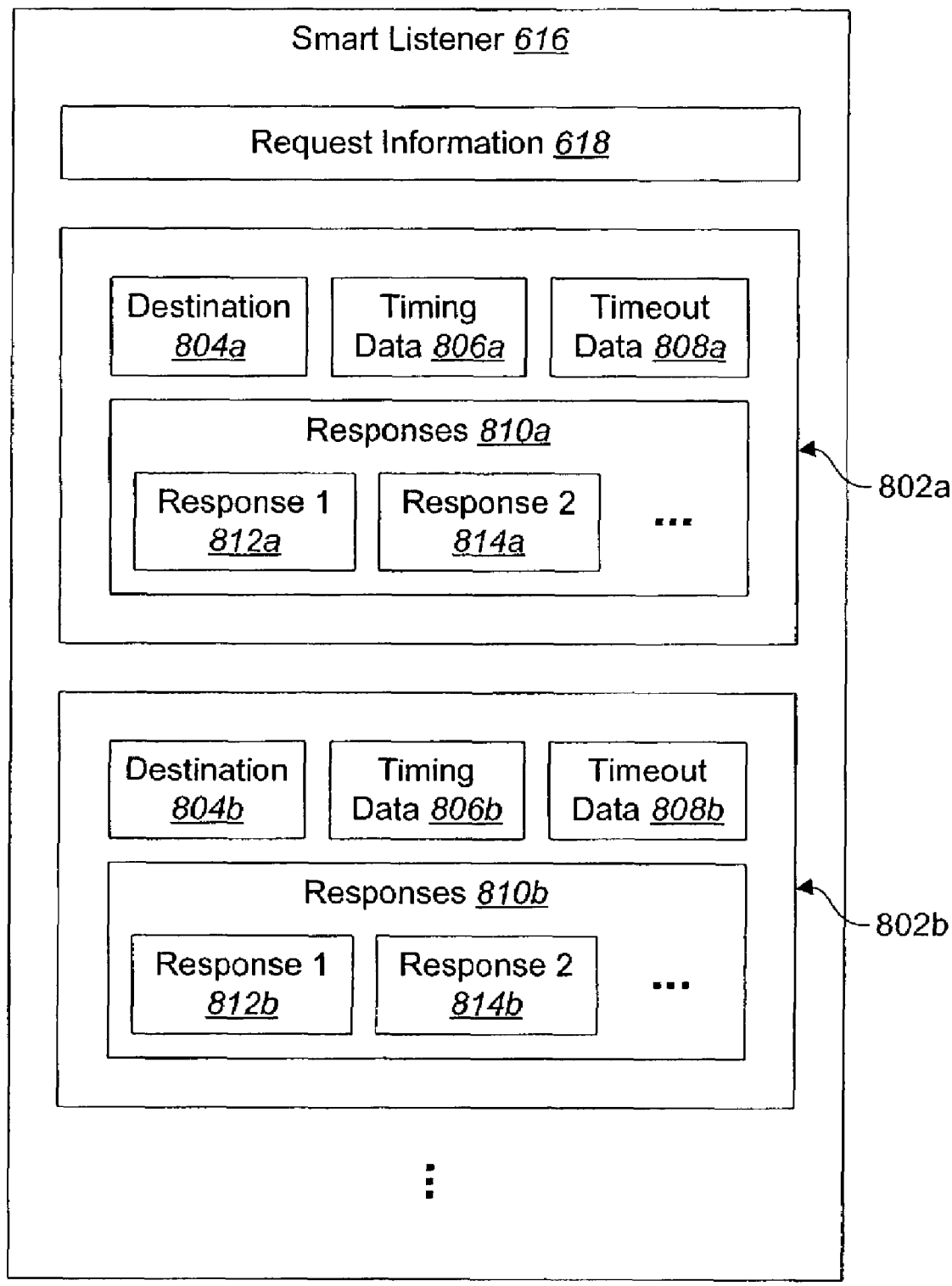
FIG. 8 is a block diagram of an embodiment of a smart listener.

FIG. 8 is a block diagram of an embodiment of a smart listener 616. The request 618, discussed in FIG. 7, may be stored by the smart listener 616. Each smart listener 616 may include one or more data items 802. As shown, each data item 802 may correspond to a destination. The destination is the receiving component that the request is being sent to, or is one of the components that the request is being sent to. The destination data 804 stores an identification of the destination associated with the particular data item 802. Timing data 806 includes timing information regarding the request and/or timing information regarding the response(s). Timeout data 808 may include timing information defining when a timeout has occurred and/or if a timeout has occurred with respect to the particular data item 802.

A responses data structure 810 may store some or all of the individual and/or incremental responses sent back by the particular destination. The response data structure 810 may include a log or history of the individual responses 812, 814, etc., received in response to the request sent out. Thus, the smart listener 616 may handle complex requests that require a number of incremental responses over a period of time. As a result, the software element 310 does not need to continually monitor the network 100 for all of the responses because the smart listener 616 receives the responses 812, 814, etc. and may continue to hold or process these responses 812, 814 until the smart listener 616 is ready to report back to the software element 310.

In operation, typically the smart listener 616 creates a data item 802 for each destination element or receiving component. For example, if the software element 310 passed a request to the smart listener 616, or to the smart listener manager 402 which would in turn pass it to the smart listener 616, that was to be sent to four destinations, the smart listener 616 may create four data items 802*a*, 802*b*, 802*c*, 802*d*. The first data item 802*a* may correspond to the first destination as indicated in the destination data 804*a*. The second data item 802*b* may correspond to the second destination as indicated in the destination data 804*b*. Etc. Each data item 802 may store the responses 812, 814, etc., received by the device 102 from the destination.

Figure 9:
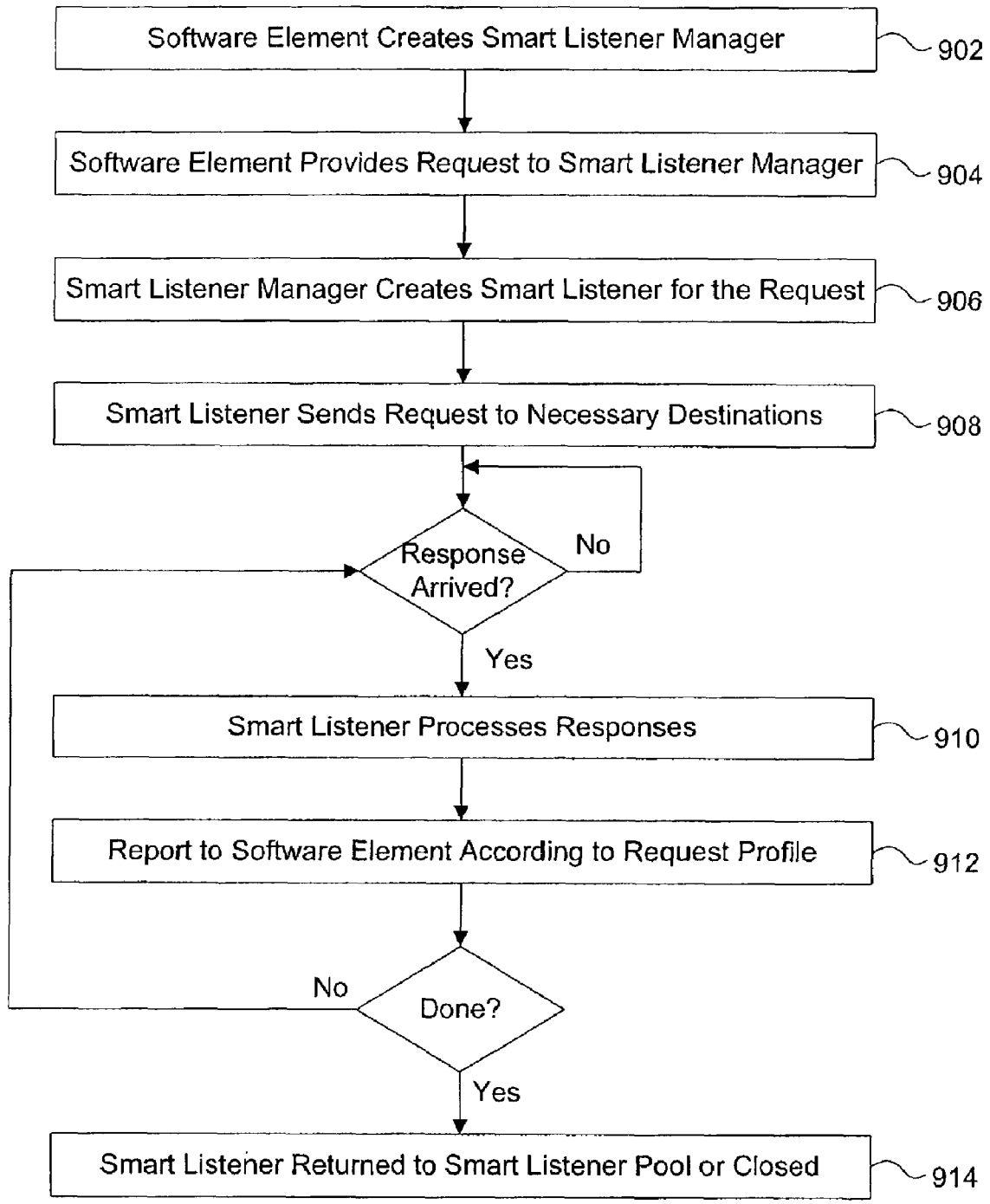
FIG. 9 is a flow diagram illustrating an embodiment of a method of using a smart listener.

FIG. 9 is a flow diagram illustrating an embodiment of a method of using a smart listener 616. The software element 310 may create 902 the smart listener manager 402. Of course, those skilled in the art will appreciate that a smart listener manager 402 may already exist in which case it may not be necessary for the software element 310 to create 902 a new smart listener manager 402.

The software element 310 may provide 904 a request to the smart listener manager 402. The smart listener manager 402 may create 906 a smart listener 616 to handle the request. Embodiments of a smart listener manager 402 may already have an available smart listener 616 such that it is not necessary to create a new smart listener 616. For example, in one embodiment of a smart listener manager 402, the manager 402 may include a pool (not shown) of smart listeners 616. When a smart listener 616 is needed, one may simply be taken from the smart listener pool (not shown) to be used. When the smart listener 616 is no longer needed, it may simply be returned to the smart listener pool (not shown).

The smart listener 616 may send 908 the request to the necessary destinations. As discussed earlier, the smart listener 616 may create data items 802 for each destination to track the responses. The smart listener 616 may be in a wait or idle state until a response is received.

The smart listener 616 processes 910 the responses. If interaction is needed with the destination, the smart listener 616 may handle the interaction. If multiple requests are needed, the smart listener 616 may create and/or send the multiple requests. As these examples illustrate, the smart listener 616 handles a substantial portion of the listening and processing needed to communicate the request across the network 100 and to obtain the response(s).

As directed by the request profile 706 or by other programming, the smart listener 616 may report 912 to the software element 310 the response, or the responses, or information relating to the response or responses. Depending on the software element's 310 preference (usually indicated in the request profile 706), the smart listener 616 or the smart listener manager 402 may provide back to the software element 310 individual responses received from each destination device on the network, the smart listener 616 data structures including the data items 802, a summary or report of the responses received, etc. The request profile may include response failure data, device removed data, device added data, state change data, partial response data, timing limits data, network related event data and response configuration data.

The smart listener 616 may continue to process responses as long as needed. When the smart listener 616 is no longer needed to process the request or the response(s), the smart listener 616 may be closed 914, deleted, or may be returned 914 to the smart listener pool (not shown).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An electronic device adapted for use in a distributed network of electronic devices, the device comprising:
   a processor;
   a communications layer in electronic communication with the processor for communications with the distributed network;
   memory in electronic communication with the processor for storing data;
   a software element configured to send a request to a plurality of receiver components where the request requires a response from each receiver component of the plurality of receiver components, and wherein the software element is further configured to send a request profile with the request, and wherein each request profile comprises profile data selected from the group consisting of response failure data, device removed data, device added data, state change data, partial response data, timing limits data, network related event data and response configuration data; and
   a smart listener configured to receive the request from the software element and to receive the request profile, and to store the request in the memory, and configured to transmit the request to the plurality of receiver components through the distributed network and to listen for responses from any of the plurality of receiver components, and further configured to report to the software element information relating to the responses.

2. The electronic device as defined in claim 1 wherein the electronic device is configured to operate on a home audio video interoperability distributed network.

3. A computer-readable medium for storing program data, wherein the program data comprises instructions that are executable to:
   run a first application of a first device on the distributed network;
   provide a first request by a first software element configured by the first application, the first request being for more than one destination device;
   provide a first request profile with the first request, wherein the first request profile comprises profile data selected from the group consisting of response failure data, device removed data, device added data, state change data, partial response data, timing limits data, network related event data and response configuration data;
   provide a second request by a second software element;
   provide the first request to a first smart listener;
   provide the second request to a smart listener manager;
   have the smart listener manager create a second smart listener for the second request and create a plurality of smart listeners for a plurality of requests received from a plurality of software elements;
   create a listener data structure that includes more than one data item, wherein at least one data item is created for each destination device, each data item comprising a receiver component identifier for identifying the destination device, a response data structure for storing one or more of the responses from the corresponding destination device, and a timing data structure for storing timing data;
   transmit the first request by the first smart listener to each destination device;
   have the first smart listener listen for any responses from the destination devices;
   store the responses in the response data structure; and
   report report data by the first smart listener to the first software element where the report data is generated based on the responses and based on a the first request profile.

4. The computer-readable medium as defined in claim 3 wherein the electronic device and the destination devices are configured to operate on a home audio video interoperability distributed network.

5. A method for communicating asynchronous messages across a home audio video interoperability distributed network, the method comprising:
   running a first application of a first device on the distributed network;
   providing a first request by a first software element configured by the first application, the first request being for more than one destination device;
   providing a first request profile with the first request, wherein the first request profile comprises profile data selected from the group consisting of response failure data, device removed data, device added data, state change data, partial response data, timing limits data, network related event data and response configuration data;
   providing a second request by a second software element;
   providing the first request to a first smart listener;
   providing the second request to a smart listener manager;
   creating, by the smart listener manager, a second smart listener for the second request and creating, by the smart listener manager, a plurality of smart listeners for a plurality of requests received from a plurality of software elements;
   creating a listener data structure that includes more than one data item, wherein at least one data item is created for each destination device, each data item comprising a receiver component identifier for identifying the destination device, a response data structure for storing one or more of the responses from the corresponding destination device, and a timing data structure for storing timing data;
   transmitting the first request by the first smart listener to each destination device;
   listening by the first smart listener for any responses from the destination devices;
   storing the responses in the response data structure; and
   reporting report data by the first smart listener to the first software element where the report data is generated based on the responses and based on a the first request profile.

6. The method as defined in claim 5 wherein the electronic device and the destination devices are configured to operate on a home audio video interoperability distributed network.

7. A consumer electronics device adapted for use in a home audio video interoperability distributed network of electronic devices, the device comprising:
   a processor;
   a communications layer in electronic communication with the processor for communications with an IEEE-1394 network;
   memory in electronic communication with the processor for storing data;

a communications media manager for enabling software components to communicate using the IEEE-1394 network;

a registry to serve as a directory for the software components;

a first software element configured to send a request to a plurality of receiver components where the first software element expects a response from each receiver component of the plurality of receiver components, and wherein the first software element is further configured to send a request profile with the request, wherein each request profile comprises profile data selected from the group consisting of response failure data, device removed data, device added data, state change data, partial response data, timing limits data, network related event data and response configuration data; and a smart listener manager configured to receive the request from the first software element and to create a smart listener, the smart listener comprising a listener data structure including a plurality of data items, the smart listener being configured to store the request in the memory and process the request profile, and configured to transmit the request to the plurality of receiver components through the IEEE-1394 network and to listen for responses from any of the plurality of receiver components, further configured to report to the first software element information relating to the responses, and wherein the smart listener manager is further configured to create a new smart listener for each new request.

* * * * *